United States Patent
Munukutla

(10) Patent No.: US 10,803,593 B2
(45) Date of Patent: Oct. 13, 2020

(54) METHOD AND SYSTEM FOR IMAGE COMPRESSION

(71) Applicant: Mohana Krishna Munukutla, Bangalore (IN)

(72) Inventor: Mohana Krishna Munukutla, Bangalore (IN)

(73) Assignee: Siemens Healthcare GmbH, Erlangen (DE)

(*) Notice: Subject to any disclaimer, the term of this patent is extended or adjusted under 35 U.S.C. 154(b) by 45 days.

(21) Appl. No.: 15/706,950

(22) Filed: Sep. 18, 2017

(65) Prior Publication Data

US 2018/0082427 A1 Mar. 22, 2018

(30) Foreign Application Priority Data

Sep. 19, 2016 (IN) .............................. 201631031831

(51) Int. Cl.
| | |
|---|---|
| *G06T 7/181* | (2017.01) |
| *G06T 7/174* | (2017.01) |
| *G06T 7/13* | (2017.01) |
| *G06T 7/11* | (2017.01) |
| *G06T 9/00* | (2006.01) |

(52) U.S. Cl.
CPC .............. *G06T 7/181* (2017.01); *G06T 7/11* (2017.01); *G06T 7/13* (2017.01); *G06T 7/174* (2017.01); *G06T 9/00* (2013.01); *G06T 2207/20112* (2013.01)

(58) Field of Classification Search
CPC ... G06T 7/181; G06T 9/00; G06T 7/11; G06T 7/174; G06T 7/13; G06T 2207/20112
See application file for complete search history.

(56) References Cited

U.S. PATENT DOCUMENTS

| | | | |
|---|---|---|---|
| 8,655,085 B2 | 2/2014 | Khawand et al. | |
| 9,756,342 B2 | 9/2017 | Cordara | |
| 2005/0262543 A1 | 11/2005 | Wu | |
| 2012/0020581 A1* | 1/2012 | Zarom ................... | H04N 19/90 382/233 |

* cited by examiner

*Primary Examiner* — Menatoallah Youssef
(74) *Attorney, Agent, or Firm* — Lempia Summerfield Katz LLC

(57) ABSTRACT

The disclosure relates to method and system for compressing an image. The method involves receiving an image of the one or more images. Further, at least one segmentation algorithm is applied on the image and dividing the image into a plurality segments. The method further includes comparing the plurality of segments of the image with a seed image, where seed images include a seed image identifier. Further, a seed image is associated with the segments of the image in case there is a match between the seed image and the plurality of segments. The method also includes storing the image as a residual image and a seed image along with one or more seed image identifiers. Further, the image may be reconstructed based on the residual image and one or more seed images associated with the image. Thereafter, the image may be displayed on a display unit.

18 Claims, 7 Drawing Sheets

METHOD AND SYSTEM FOR IMAGE COMPRESSION

The application claims the benefit of Indian Patent Application No. IN 201631031831, filed Sep. 19, 2016, which is hereby incorporated by reference in its entirety.

FIELD OF TECHNOLOGY

This disclosure relates to a method for compressing an image. More specifically, the disclosure relates to a computing device and a method of lossless compression by generating and linking seed images.

BACKGROUND

In the recent times, medical applications are being migrated to the cloud infrastructure. There are many reasons for the shift. The cloud platform offers a scalable solution for computational power and storage requirements. Medical applications are well suited for the cloud platform as there is requirement for scaling the storage with time as there are a large number of images acquired by imaging modalities on a daily basis. Imaging modalities may be an X-ray diagnostic machine to a positron emission tomography (PET) scanner. The images generated by the imaging modalities vary in their size, quality, and clinical use. In certain examples, the images generated by the imaging modalities may vary between 256 KB to few megabytes in size. It is well known in the art that the medical imaging data is stored in a digital imaging and communications in medicine (DICOM) format. In a specific example, a size of a computerized tomography (CT) image may range between 256 KB to 2 MB. In certain cloud storage based medical applications, image (DICOM) data received from the medical imaging modalities is stored for purposes like sharing and post analysis. In such scenarios, the data size may quickly reach the range of terabytes or petabytes in a short span of time.

A healthcare service provider may store the large number of images generated by the imaging modalities in a server in real-time. The server may be hosted using cloud computing infrastructure. In certain workflows, a large image set from a patient may be transferred to cloud storage. For example, an image study may include a number of slices of a body part of a patient that may range to hundreds of images for a single patient. Due to the size and the number of images, there is a need for a lot of space to store these images. The storage costs for storing these images may rise very quickly.

The demand for the storage space may be reduced using image compression algorithms. Image compression algorithms include a lossy compression and lossless compression. In the medical field, a lossless compression method may be performed as there should not be any loss of pixel data in such a method. The pixel data should not be lost as there may be a chance of misdiagnosis. The medical images are stored in a DICOM format, which is a standard for storing medical images. Currently, there are some lossless image compression algorithms being applied on the DICOM images. However, the algorithms do not yield a good compression ratio where all the data of the image is preserved. Further, the medical images once stored are not accessed frequently. The medical guidelines have made it mandatory for storing the medical images for a period of 15 years. With these conditions taken into consideration, the storage costs of medical images may escalate quickly. Therefore, there is a need for an effective lossless image compression algorithm for storing the medical images. Further, the costs for storing the medical images may be considerably reduced with the use of an effective lossless image compression method.

SUMMARY

Therefore, it is an object of the disclosure to provide an image compression algorithm that is lossless and adheres to all the medical image storage guidelines.

The object is achieved by providing a method, a computing device, and a system for compressing medical images.

The scope of the present disclosure is defined solely by the appended claims and is not affected to any degree by the statements within this summary. The present embodiments may obviate one or more of the drawbacks or limitations in the related art.

In an embodiment, the method includes obtaining an image of the one or more images, wherein the image includes pixel data. The one or more images may be stored in an image database or generated in real-time by a medical imaging modality. Further, at least one segmentation algorithm is applied on the image for dividing the image into a plurality segments. Thereafter, it is determined if there is a seed image in the image database. The plurality of segments of the image is compared with the seed image if the seed image is available in the server. Further, the seed image is associated with the plurality of segments of the image in case there is a match between the seed image and the plurality of segments. The seed image is associated with the image by assigning a seed image identifier (SID) to the plurality of matching segments.

The image generation module is configured for generating at least one of a residual image and a seed image from the plurality of segments which do not match with the seed image. Further, the image is stored as at least one of a residual image and a seed image along with one or more seed image identifiers, wherein each of the seed image identifiers (SIDs) are associated with a seed image. The aforementioned acts are repeated for all the images obtained subsequent to the image.

In another embodiment, the method further includes receiving a request for the image. Thereafter, at least one of a residual image and one or more seed images associated with the image are retrieved. Further, the image is reconstructed using the residual image and one or more seed images associated with the image, wherein the seed images are retrieved based on the SIDs. Finally, the image is displayed on a display device.

In yet another embodiment, the method of associating at least one seed image with at least a segment of the image includes replacing pixel data of the plurality segments of the image with a seed image identifier, wherein the seed image identifier is an alphanumeric string. The alphanumeric string is used to replace the pixel data of a segment of the image thereby reducing the size thereof.

In still yet another embodiment, the act of generating at least one of a residual image and a seed image from the one or more segments of the image includes retaining a segment of the plurality of segments of the image as a residual image. The residual image does not match with the at least one seed image. Thereafter, a segment of the plurality of segments of the image is stored as seed image and the seed image is assigned a unique seed image identifier.

In another embodiment, the generating of at least one of a residual image and a seed image from the one or more segments of the image includes retaining a segment of the plurality of segments of the image as a residual image, wherein the residual image does not match with the at least one seed image. Further, a segment of the plurality of segments of the image is stored as a seed image, wherein the seed image is assigned a unique seed image identifier (SID).

To further achieve the object, a computing device including one or more processors, an image capture device, a display, and one or more memory units is disclosed. The memory units include an image compression module that performs the method all of the method as stated above. Further, a system for compressing an image is disclosed. The system includes a processor, wherein the processor is communicatively coupled to an image server, one or more client devices and one or more medical imaging modalities. A memory unit coupled to the processor, wherein the memory unit includes an image compression module. The image compression module is configured to perform all the method acts as disclosed above.

BRIEF DESCRIPTION OF THE DRAWINGS

The above mentioned and other features of the disclosure will now be addressed with reference to the accompanying drawings. The illustrated embodiments are intended to exemplify, but not limit the disclosure.

The present disclosure is further described hereinafter with reference to illustrated embodiments shown in the accompanying drawings, in which.

DETAILED DESCRIPTION

Figure 1:
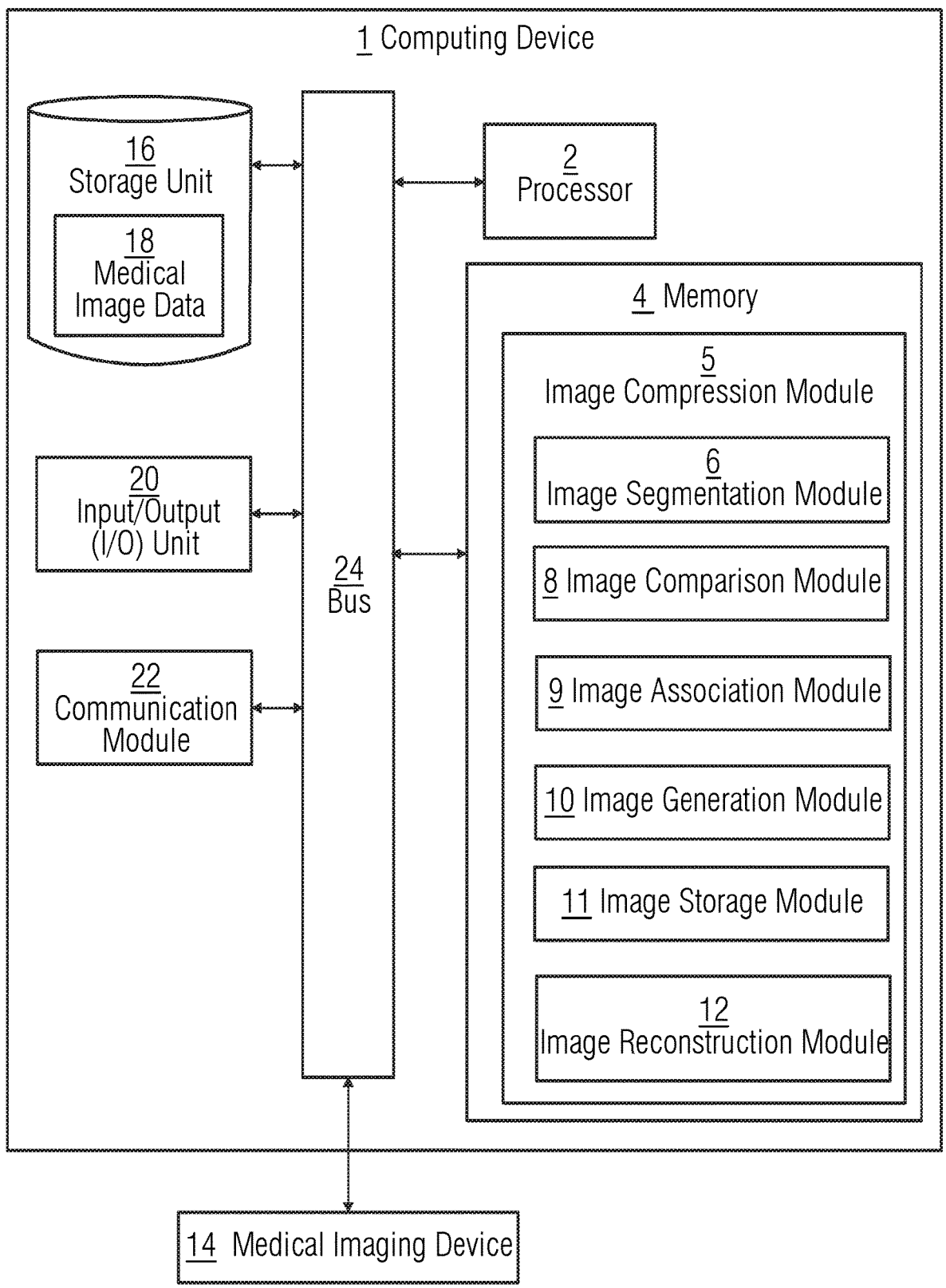
FIG. 1 illustrates a computing device configured for compressing an image, in accordance with an embodiment.

Various embodiments are described with reference to the drawings, wherein like reference numerals are used to refer like segments throughout. In the following description, for the purpose of explanation, numerous specific details are set forth in order to provide thorough understanding of one or more embodiments. It may be evident that such embodiments may be practiced without these specific details.

FIG. 1 illustrates a computing device for tracking objects in a fluoroscopy video, in accordance with an embodiment. FIG. 1 illustrates an exemplary block diagram 1 of the computing device 1 for generating electronic medical records, in accordance with an embodiment. The computing device 1 includes a processor 2, a memory 4, a storage unit 16, an input/output (I/O) unit 20, and a communication module 22. The computing device 1 is also communicatively coupled to a medical imaging device 14. The medical imaging device 14 may include, but is not limited to, a Magnetic Resonance Imaging device, a Computerized Tomography imaging device, and the like. The aforementioned components are connected to each other by a bus unit 24. The processor 2, as used herein, refers to any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 2 may also include embedded controllers, such as generic or programmable logic devices or arrays, application specific integrated circuits, single-chip computers, and the like.

The memory 4 may be volatile memory and non-volatile memory. A variety of computer-readable storage media may be stored in and accessed from the memory 4. The memory 4 may include any suitable elements for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like. As depicted, the memory 4 includes an image compression module 5, which in turn includes an image segmentation module 6, an image comparison module 8, an image association module 9, an image generation module 10, an image storage module 11, and an image reconstruction module 12. In an embodiment, image segmentation module 6 is configured for applying at least one segmentation algorithm to divide an image into a plurality of segments. The segmentation algorithm may be based on at least one of, but not limited to, an edge detection algorithm, a pixel value, an imaging modality type, and a body region. The resolution of the segmentation of the images may also be changed based on the available computing power and the required compression level. The details will be explained in conjunction with FIG. 4. Further, the image comparison module 8 is configured for determining if there is at least one seed image existing in an image database. Thereafter, the seed image comparison module 8 is configured for comparing the plurality of segments of the image with a seed image. In case there are no seed images for comparison, the next act proceeds to the image generation module 10. In the case where a seed image is present, the next act is performed by the image association module 9. The image association module 9 is configured for associating the seed image with the plurality of segments in case there is a match between the at least one seed image and the plurality of segments. The image association module 9 compares the segments of the image with one or more seed images. In case there is a match, the image association module 9 associates the pixel data of the matching segment with a Seed Image Identifier (SID). The pixel data may now be retrieved from the seed image instead of storing the pixel data of the image. The memory 4 further includes the image generation module 10 configured for generating at least one of a residual image and a seed image. The residual image and the seed image are generated from the plurality of segments which do not match with the at least one seed image. In an example, the image generation module 10 may generate a residual image when a segment of the image does not match with any of the seed images. However, there may be other segments in the image which are matching with one or more seed images. In another case, there may not be any seed image available for comparing the segments of the image. In such as case, the image generation module 10 generated one or more seed images from the segments of the image. The seed images generated therein may be used for comparison with the subsequent images which received by the computing device 1. Thereafter, the image storage module 11 is configured for storing the image as at least one of a seed image and a residual image along with the one or more associated seed images. In an exemplary scenario, the image storage module 11 stores the image as a residual image, a seed image, and SID of one or more seed images associated with the image in the image database. In one case, the image may be stored as one or more seed images having corresponding SIDs. In another case, the image may be stored as one or more residual image and associating one or more SIDs of matching seed images. In still another case, the image may be stored as it is.

Further, the memory unit 4 includes the image reconstruction module 12 for reconstructing the image when a query for the image is received by the image reconstruction module 12. In an exemplary scenario, at least one of a residual image and one or more seed images associated with the image are retrieved. In another exemplary scenario, the image may be associated with SIDs of one or more seed images. In this case, the image reconstruction module 12 reconstructs the image by retrieving the one or more seed image associated with the one or more SIDs. In another case, the image may be reconstructed using a combination the residual image and one or more seed images retrieved using the SIDs associated with the image. Thereafter, the image reconstruction module 12 is configured to display the image on a display device. The display device may be a part of the I/O devices communicatively coupled to the computing device 1.

The storage unit 16 may be a non-transitory storage medium configured for storing medical image data 18, which includes medical images and fluoroscopy videos. The image database 18 may further include seed images generated from one or more images. In another case, the image database 18 also houses the SIDs of the one or more segments of the images. The image association module 9, the image generation module 10, the image storage module 11, and the image reconstruction module 12 are configured to access the storage unit 16 for storing, linking, and retrieving image data, SID, seed images, and residual images from the storage unit 16. In an exemplary embodiment, the storage unit 16 may be hosted on a cloud computing environment and the computing device 1 accesses the storage unit 16 in the cloud for manipulating the images.

The input output module 20 may include a keyboard, keypad, touch sensitive display screen, mouse, and the like. The input/output devices 20 enable the user to interact with the computing device 1 for controlling the operating state. For example, a display unit may be used to display a reconstructed fluoroscopy image by linking one or more seed images with a residual image.

The device 1 further includes a communication module 22 for communicating with other devices via a network connection. The communication module 22 may include a Wi-Fi transceiver, a network interface card (NIC), and the like. All the aforementioned components may be communicatively coupled through a communication bus 24.

The device 1 may be communicatively coupled to a medical imaging modality 14 capable of generating medical diagnostic images. The medical diagnostic images may include, but not limited to, a CT scan, an MRI image, an X-ray image, and a PER image. The medical imaging modality may be for example a real-time X-ray modality. The device 1 may be configured to receive fluoroscopy videos directly from the medical imaging modality 14.

Figure 2:
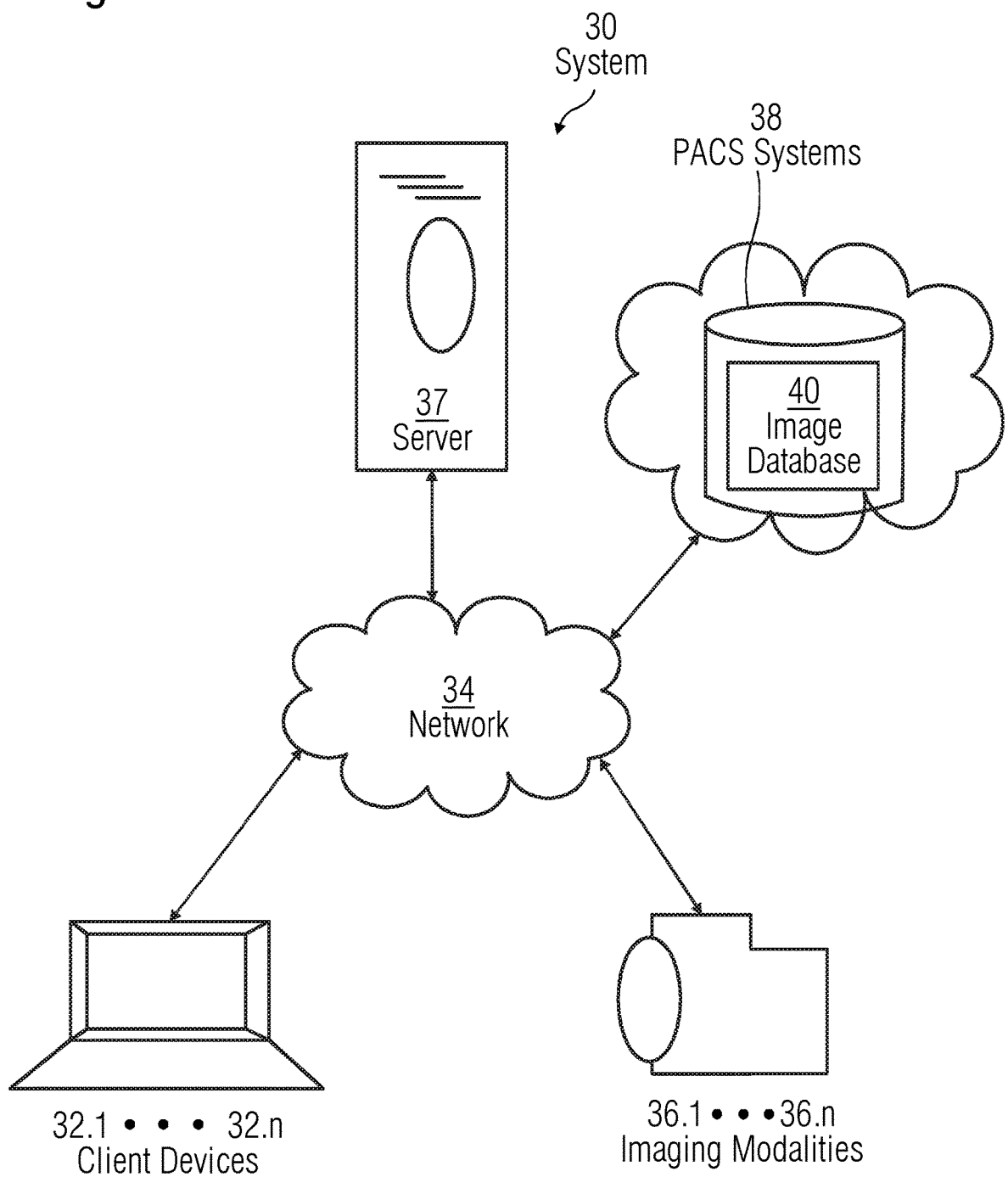
FIG. 2 illustrates an exemplary system for compressing the image, in accordance with an embodiment.

FIG. 2 illustrates an exemplary system for compressing the image, in accordance with an embodiment. The system 30 includes client devices 32.1-32.n, network 34, one or more imaging modalities 36.1-36.n, a server 37, one or more PACS systems 38, and one or more image database such as image database 40 hosted on a cloud computing environment. In an exemplary embodiment, the image database 40 may be a Picture archiving and communication system (PACS). The client devices 32.1-32.n and imaging modalities 36.1-36.n may include one or more processor having the image compression module 5 configured to perform image compression of one or more images as explained in conjunction with FIG. 1. The images may be compressed by the modules present in the image compression module 5 in both the client devices 32.1-32.n and imaging modalities 36.1-36.n. The client devices 32.1-32.n and imaging modalities 36.1-36.n may be communicatively coupled to the image database 40 hosted in cloud computing environment 38. The images may be compressed and stored in the image database 40. Further, the seed images and the associated SIDs may also be stored in the image database 40.

Figure 3:
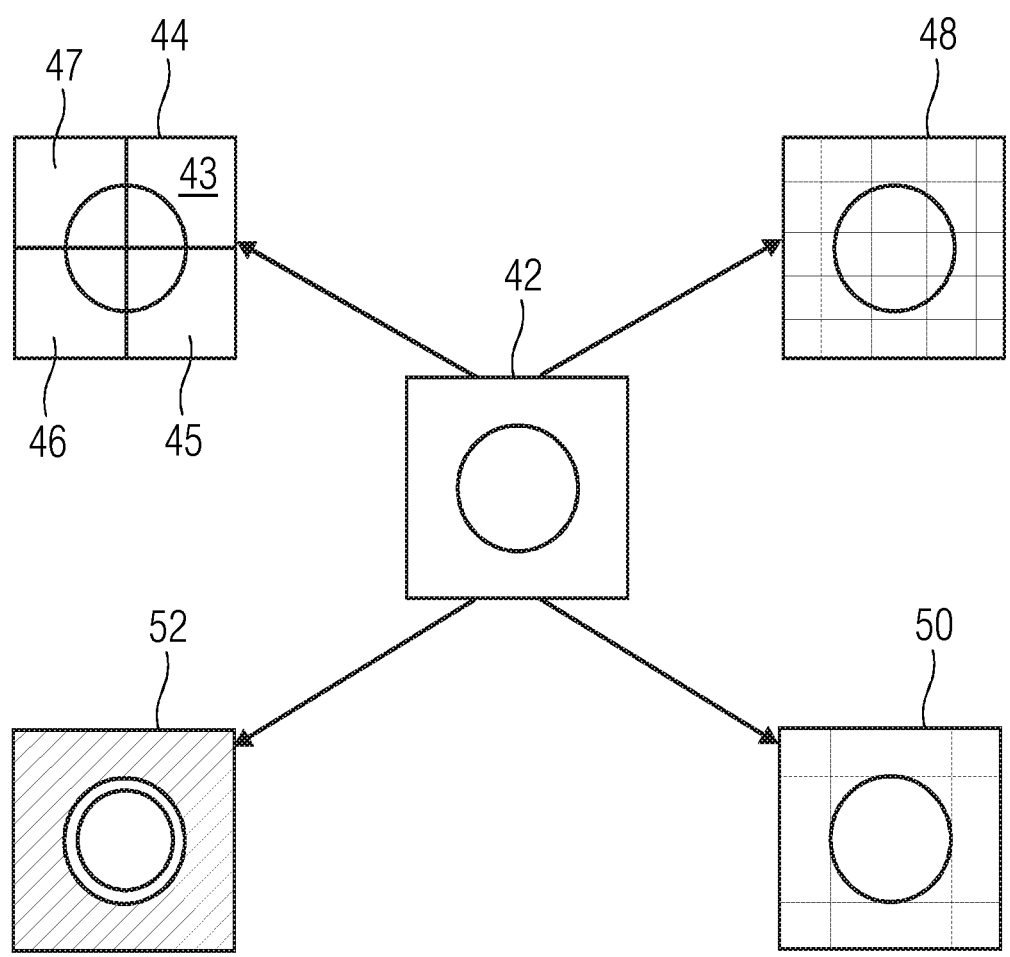
FIG. 3 illustrates an exemplary operation of the image segmentation module, in accordance with an embodiment.

FIG. 3 illustrates an exemplary operation of the image segmentation module, in accordance with an embodiment. In an exemplary embodiment, the image segmentation module is a set of computer executable instructions capable for segmenting the image into a plurality of segments using one or more segmentation algorithms. The image segmentation module may be configured to divide the image into a plurality of segments based on at least one of, but not limited to, an edge detection algorithm, a histogram value, a pixel vale, imaging modality type and a body region. For example, the image may be segmented based on an edge detection algorithm. In this case, the image such as image 42 is segmented based on edge detection algorithms where the edge detection algorithms separate a Region of Interest (ROI) from background pixels. The segmented image 48 illustrates that the ROI of image 42 and the background pixels are marked. In another example, the image 42 may be segmented using pixel values. In medical images, the images may have portions that are black, which may provide no useful information to a physician/radiologist. Such image segmentation module may identify these areas based on pixel values and segment the image accordingly. In this case, the image 43 may be segmented as image 50. In another example, the image may be segmented into equal parts as illustrated in FIG. 3. In another example, the image 43 may be segmented at a higher resolution such as image 48. Further, the image 43 may be segmented based on an imaging modality and a body region. For example, the CT scan of a brain of a patient has a unique pattern. The image segmentation module may segment the image based on the unique patterns. The image segmentation module may include one or more machine learning algorithms to identify the patterns of each body time or modality type. A training dataset may be used to improve the accuracy and efficiency of the image segmentation module. Further, the image 43 may be stored in the image database 40, which may be hosted on a cloud computing environment.

In an exemplary scenario, the image 43 may be a first image received by the computing device. Therefore, there may be no seed images available in the image database. As a result, the image generation module 10 may generate four seed images 44, 45, 46 and 47 from the image 43. Further, each seed image is associated with a unique Seed Image Identifier (SID). The working of image generation module 10 is explained in further detail.

Figure 4:
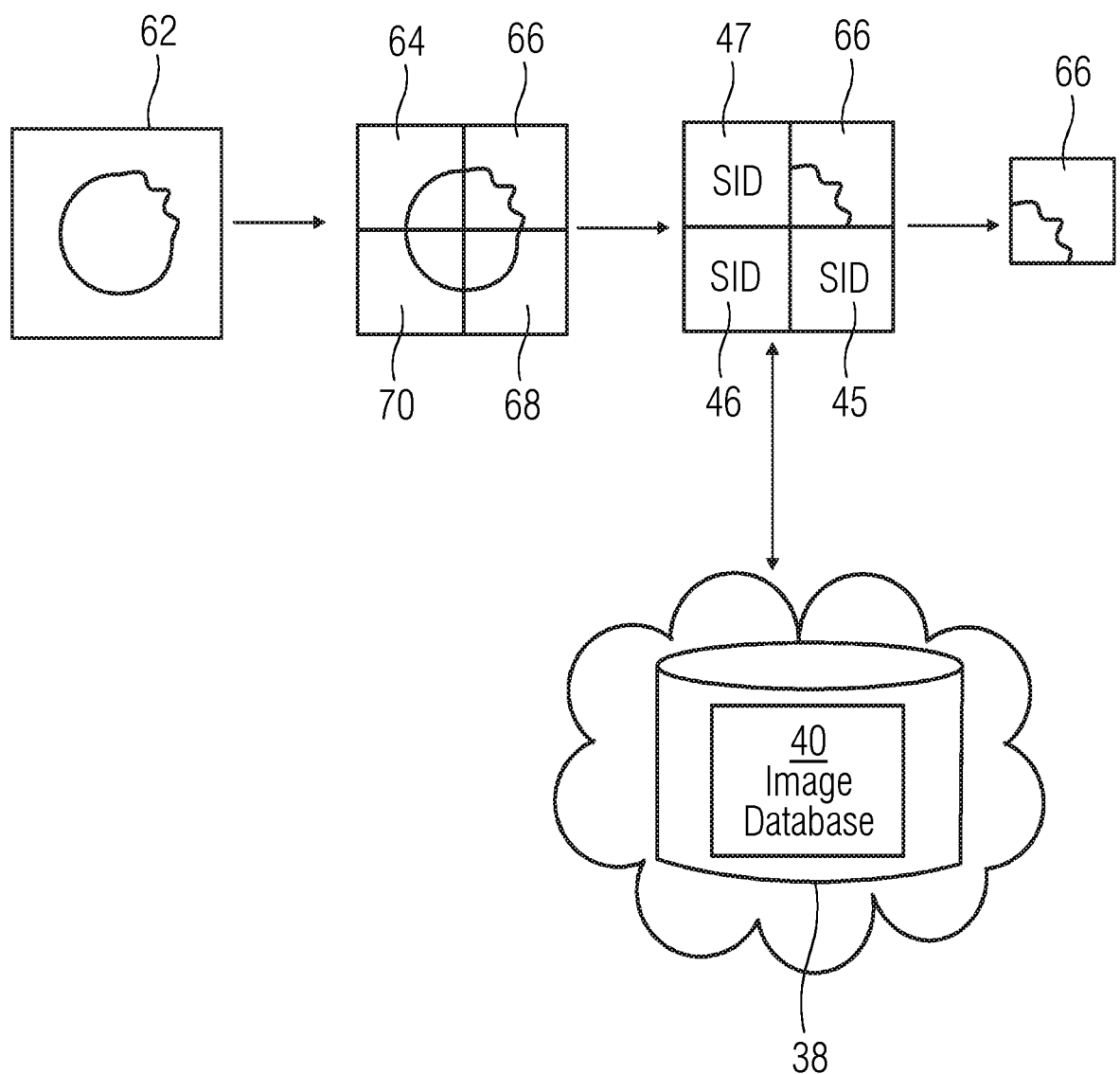
FIG. 4 illustrates an exemplary operation of an image association module, in accordance with an embodiment.

FIG. 4 illustrates an exemplary operation of an image association module, in accordance with an embodiment. As illustrated in FIG. 4, an image 62 is received by the computing device 1. The image 62 is divided into segments 64, 66, 68, and 70 by the image segmentation module. In this case, the image comparison module compares the segments 64, 66, 68, and 70 of the image 62 with one or more seed images, if available. Because the segments of the image 43 were stored as seed images 44, 45, 46, and 47, the image comparison module compares the segments of the image 62 with the seed images. The image comparison module determines a match between the segments 64, 68, and 70 of the image 62 with the segments 45, 46, and 47 of the image 43. Based on the inputs from the image comparison module, the image association module links the SIDs of the matching segments with the image 62. Thereafter, the image segment 66, which does not match with any of the seed images, is retained as a residual image. The residual image may also be associated with a unique identification number. In an exemplary scenario, the image segment 66 may be stored as a seed image with a unique SID associated therewith.

Figure 5:
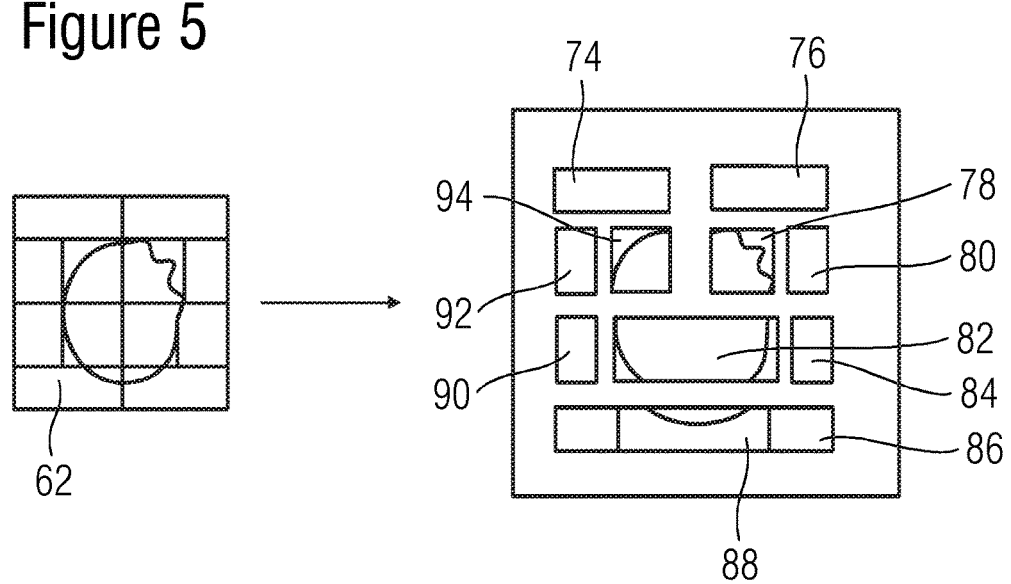
FIG. 5 illustrates another exemplary operation of an image generation module 10, in accordance with an embodiment.

FIG. 5 illustrates another exemplary operation of an image generation module 10, in accordance with an embodiment. The image generation module 10 is configured for generating at least one of a residual image and a seed image from the plurality of segments which do not match with the at least one seed image. The image generation module 10 generated residual image or seed image based on the output of the image comparison module. In case some of the segments of an image such as image 62 do not match with one or more seed images stored in the image database 40, then the image generation module 10 generates residual images and seed images from the image. For example, image 62 may be the image in a series of images and there are no seed images stored from earlier images. In this case, the image comparison module determines that there are no seed images for comparison and passes this output to the image generation module 10. The image generation module 10 may generate a residual image or a seed image from the segments of the image 62. In an example, the image 62 may be divided into a plurality of segments such as, image segments 74, 76, 78, 80, 82, 84, 86, 88, 90, 92, and 94. Among the image segments, the image generation module 10 may generate either a residual image or a seed image based on the properties of the image. For example, when the image segments do not match any of the seed images or the seed images do not exist, then the image segmentation module may generate seed images from the image segments. The seed images may be associated with a unique SID. In another example, if the image segments match with one or more seed image already present in the image database 40, then the image generation module 10 may generate a residual image(s) from the unmatched segments. The residual images are stored as pixels in the image database 40 whereas the pixel data of the matching segments are replaced by the corresponding SIDs.

Figure 6:
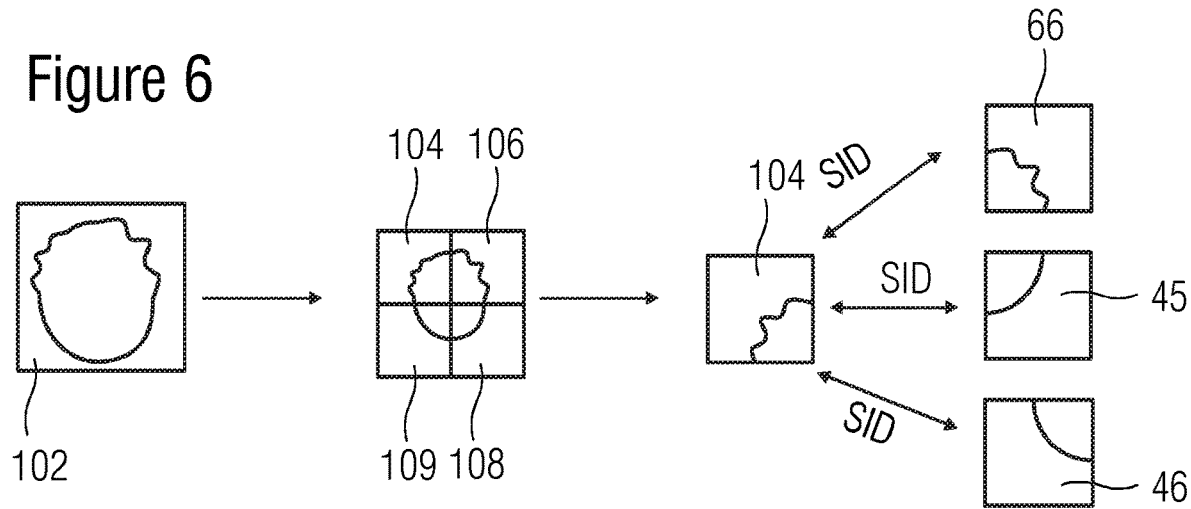
FIG. 6 illustrates an example of the operation of an image reconstruction module 12, in accordance with an embodiment.
Figure 7:
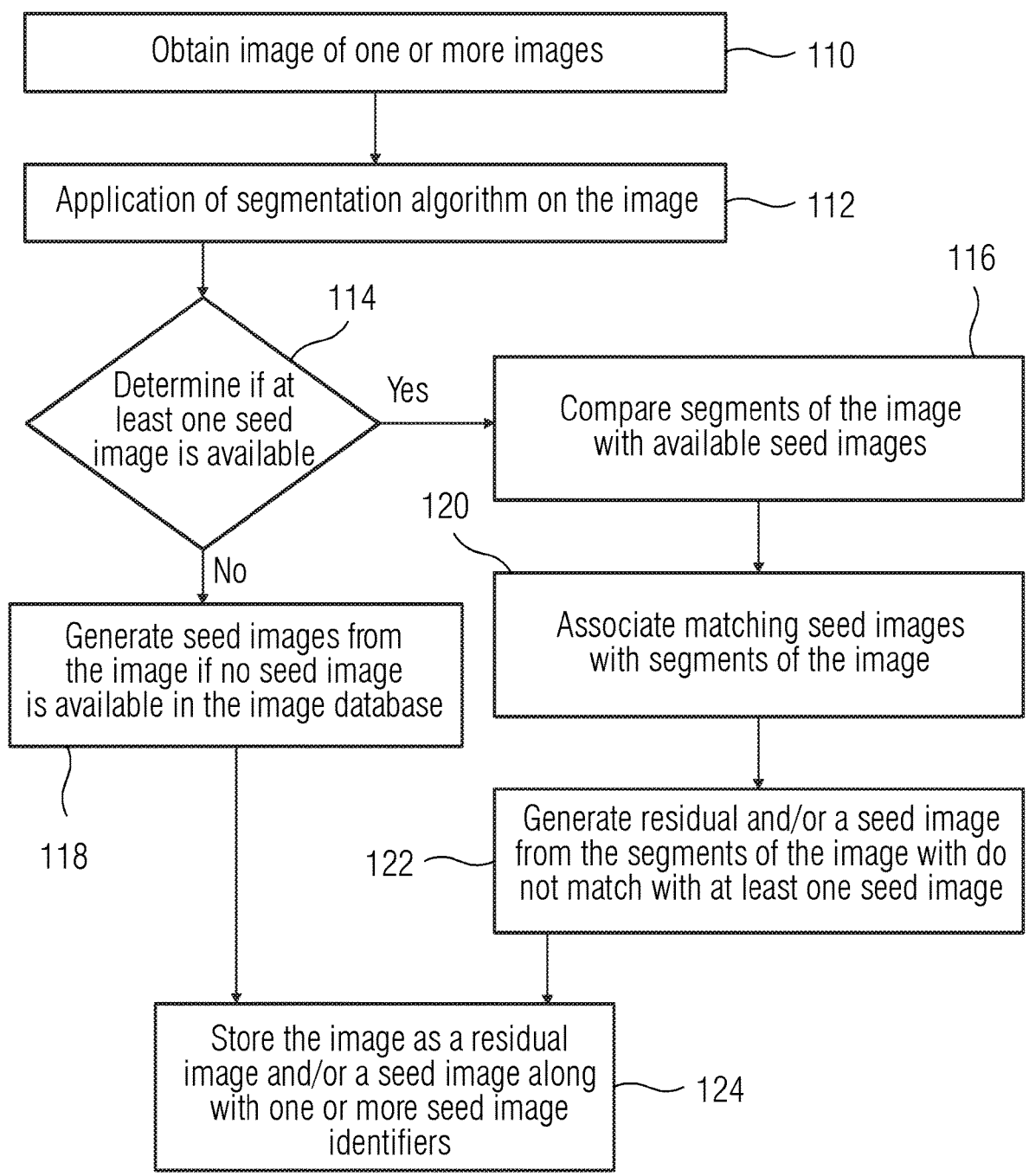
FIG. 7 illustrates exemplary method acts of compressing an image, in accordance with an embodiment.

FIG. 6 illustrates an example of the operation of an image reconstruction module 12, in accordance with an embodiment. In an exemplary scenario, an image 102 is received after the image 62, as shown in FIG. 7. In an exemplary embodiment, the image segmentation module may divide the image 102 into 4 segments as shown in FIG. 7. Thereafter, the image segments 104, 106, 108, and 109 are compared with any available seed image in the image database 40. In this case, let us consider that the seed images associated with the 64, 66, 68, and 70 are available as seed images in the image database 40. The image comparison module may compare the segments of the image 102 with the seed images 44, 45, 46, 47, and 66 having unique SIDs for each of them. The image comparison module determines that the segments 66, 45, and 46 match with the segments 106, 108, and 109. Thereafter, the image association module associates the SIDs of the matching segments with the pixel data of the image 102. Subsequently, the image storage module 11 may store the image 102 as a residual image 104 and SIDs for segments 106, 108, and 109.

Further, the computing device 1 may receive a query for retrieving image 102. Thereafter, the image reconstruction module 12 fetches a residual image and one or more seed images associated with the image 102. The seed images 66, 68, and 70 are retrieved based on the SIDs stored with the image 102. The image 102 is not stored as a whole image but as a residual image 104 along with SIDs which link to the seed images. Thereafter, the image reconstruction module 12 is configured for reconstructing the image using the residual image and one or more seed images associated with the image, wherein the seed images are retrieved based on the seed image identifiers. Finally, the complete image 102 is displayed on a display device.

FIG. 7 illustrates exemplary method acts of compressing an image, in accordance with an embodiment. At act 110, an image of the one or more images is obtained. The image includes pixel data and may be obtained from at least one of an image repository and a medical imaging modality. At act 112, a segmentation algorithm is applied on the image for dividing the image into a plurality segments. In an example, the image is segmented based on at least one of an edge detection algorithm, pixel values, a histogram value an imaging modality type, and a body region. At act 114, it is determined if there is at least one seed image. The availability of the seed image is determined by searching a database and/or a medical imaging modality for at least one seed image. In some cases, seed images may be generated by one or more medical diagnostic images generated before processing the image. In case seed images are available, the plurality of segments of the image is compared with the available seed images at act 116. The features of the plurality of segments of the image are compared with the seed images based on a pixel value comparison, histogram comparison, applying machine learning algorithms, and the like. At act 120, the matching seed images are associated with the plurality of segments of the image. The seed images are associated with the segments of the image by assigning a seed image identifier (SID) to the plurality of segments. For example, the seed image is associated with a segment of the image by replacing pixel data of the segment with a seed image identifier (SID), wherein the seed image identifier is an alphanumeric string. At act 122, a residual image and/or a seed image is generated from the plurality of segments which do not match with the at least one seed image. In an exemplary scenario, the residual image is generated by retaining a segment of the plurality of segments of the image as a residual image. Further, a segment of the image is stored as a seed image with a unique seed image identifier (SID). The method follows act 118 in case the seed images are not available. In act 118, seed images are generated from the image in case no seed image is available in the image database. At act 124, the image is stored as a residual image and/or a seed image along with one or more seed image identifiers (SIDs), wherein each of the seed image identifiers (SIDs) are associated with a seed image. Further, the aforementioned acts are repeated for all the images obtained subsequent to the image.

Figure 8:
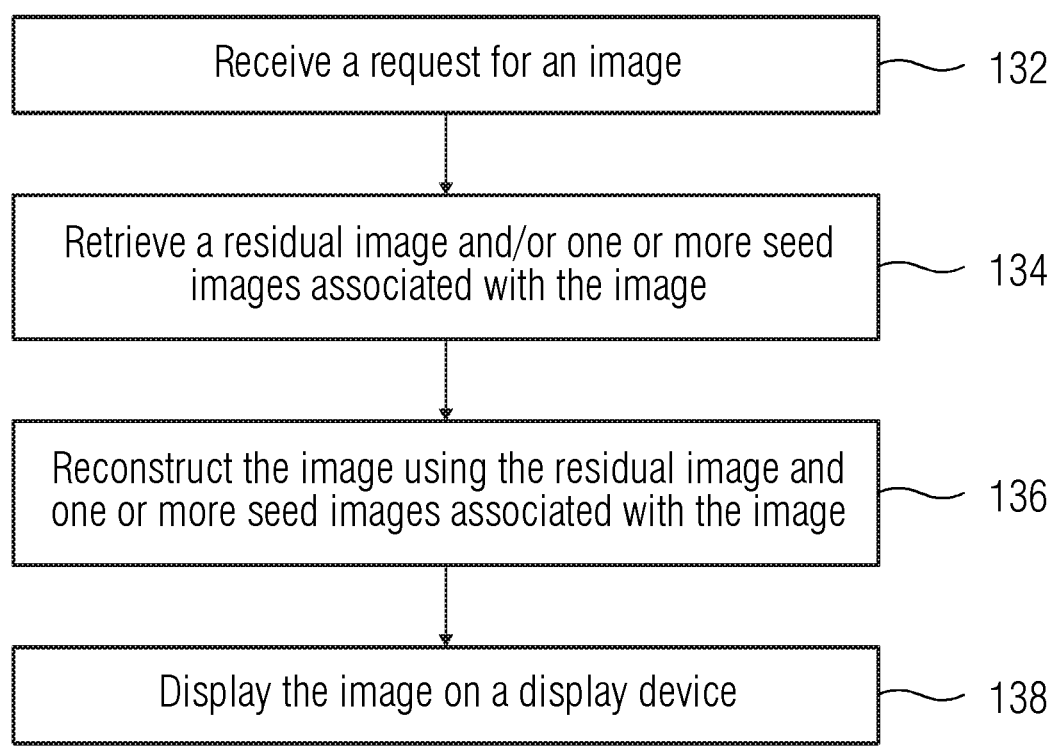
FIG. 8 illustrates exemplary method acts of reconstruction of the image from a residual image and one or more seed images, in accordance with an embodiment.

FIG. 8 illustrates exemplary method acts of reconstruction of the image from a residual image and one or more seed images, in accordance with an embodiment. At act 132, a request for an image is received. At act 134, a residual image and/or one or more seed images associated with the image is retrieved. The residual images and/or seed images may be retrieved from an imaging database. The seed images may be retrieved using the corresponding SIDs. At act 136, the image is reconstructed using the residual image and one or more seed images associated with the image. Finally, at act 138, the image may be displayed on a display device.

The advantageous embodiment of the disclosed method and system reduces the storage space required for storing images and in particular medical images. The method may also be used to optimize the storage for long time image storages such as PACS systems, which may be used in the medical domain. The segmentation and the properties of the seed images may be customizable based on the user preferences. For example, if there is a need for high compression, the segmentation may be performed at a higher resolution so that more seed images are formed and images may be associated with more seed image accurately. Over a period of time, the accumulated seed images may be used for associating with images thereby increasing the image compression factor. Further, the size of the seed image may be configured based on, but not limited to, imaging modality type, resolution of the image, slice thickness, and other factors. The method and system provides a lossless image compression mechanism which is particularly good for medical images.

While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments, as described herein. The scope of the present disclosure is, therefore, indicated by the following claims rather than by the foregoing description. All changes, modifications, and variations coming within the meaning and range of equivalency of the claims are to be considered within their scope.

The invention claimed is:

1. A method of compressing an image, the method comprising:
   receiving an image of one or more images, wherein the image comprises pixel data;
   applying at least one segmentation algorithm on the image for dividing the image into a plurality segments;
   determining if there is at least one seed image;
   when there is the at least one seed image, comparing the plurality of segments of the image with the at least one seed image;
   associating the at least one seed image with the plurality of segments of the image in case there is a match between the at least one seed image and the plurality of segments;
   generating at least one of a residual image and a seed image from the plurality of segments that do not match with the at least one seed image, wherein the generating comprises:
      retaining a segment of the plurality of segments of the image as a residual image, wherein the residual image does not match with the at least one seed image; and
      storing a segment of the plurality of segments of the image as a seed image, wherein the seed image is assigned a unique seed image identifier;
   storing the image as the residual image along with the seed image identifier, wherein the seed image identifier links to the seed image; and
   repeating the receiving, the applying, the comparing, the associating, the generating, and the storing for all images obtained subsequent to the image.

2. The method of claim 1, further comprising:
   receiving a request for the image;
   retrieving at least one of a residual image and one or more seed images associated with the image;
   reconstructing the image using the at least one of the residual image and the one or more seed images associated with the image,
   wherein the one or more seed images are retrieved based on the seed image identifier;
   displaying the image on a display device.

3. The method of claim 1, wherein the segmentation algorithm comprises segmenting the image based on an edge detection algorithm, pixel values, a histogram value an imaging modality type, a body region, or any combination thereof.

4. The method of claim 1, wherein the determining comprises analyzing an image database for seed images stored from earlier images.

5. The method of claim 1, wherein the comparing comprises comparing features of the plurality of segments of the image with the at least one seed image based on a pixel value comparison, a histogram comparison, an application of a machine learning algorithm, or any combination thereof.

6. The method of claim 1, wherein the associating comprises replacing pixel data of the plurality segments of the image with the seed image identifier, and
   wherein the seed image identifier is an alphanumeric string.

7. The method of claim 1, wherein the determining comprises searching at least one of a database and a medical imaging modality for at least one seed image, and
   wherein the at least one seed image is generated by one or more medical diagnostic images generated before processing the image.

8. The method of claim 1, wherein the image is a medical diagnostic image.

9. The method of claim 1, wherein the image is obtained from at least one of an image repository and a medical imaging modality.

10. A computing device comprising:
   one or more processors;
   an image capture device;
   a display; and
   one or more memory units comprising:
      an image compression module, wherein the image compression module comprises an image segmentation module configured to apply at least one segmentation algorithm to divide an image into a plurality of segments;
      an image comparison module configured to determine if there is at least one seed image, and when there is the at least one seed image, compare the plurality of segments of the image with the at least one seed image;
      an image association module configured to associate the at least one seed image with the plurality of segments in case there is a match between the at least one seed image and the plurality of segments;

an image generation module configured to generate at least one of a residual image and a seed image from the plurality of segments that do not match with the at least one seed image, wherein the image generation module is further configured to:
retain the plurality of segments as a residual image, wherein the residual image does not match with the at least one seed image; and
store the plurality of segments as seed images, wherein the seed images are assigned at least one unique seed image identifier; and
an image storage module configured to store the image as the residual image along with the at least one seed image identifier linking to the at least one seed image.

11. The computing device of claim 10, wherein the image compression module comprises an image reconstruction module configured to:
receive a request for the image;
retrieve at least one of the residual image and the one or more seed images associated with the image;
reconstruct the image using the at least one of the residual image and the one or more seed images associated with the image; and
display the image on a display device.

12. The computing device of claim 10, wherein the image comparison module is further configured for comparing features of the plurality of segments of the image with the at least one seed image based on a pixel value comparison, a histogram comparison, an application of a machine learning algorithm, or any combination thereof.

13. The computing device of claim 10, wherein the image association module is further configured to replace pixel data of the one or more segments of the image with the seed image identifier, where the seed image identifier includes an alphanumeric string.

14. The computing device of claim 10, wherein the computing device is communicatively coupled with an image server.

15. The computing device of claim 10, wherein the computing device is a mobile computing device, a stationary computing device, or an imaging modality.

16. The computing device of claim 10, wherein the image capture device is a medical imaging modality.

17. A system for compressing an image, the system comprising:
a processor communicatively coupled to an image server, one or more client devices, and one or more medical imaging modalities;
a memory unit coupled to the processor, wherein the memory unit comprises an image compression module having:
an image segmentation module configured to apply at least one segmentation algorithm to divide the image into a plurality of segments;
an image comparison module configured to determine if there is at least one seed image, and when there is the at least one seed image, compare the plurality of segments of the image with the at least one seed image;
an image association module configured to associate the at least one seed image with the plurality of segments in case there is a match between the at least one seed image and the plurality of segments;
an image generation module configured to generate at least one of a residual image and a seed image from the plurality of segments that do not match with the at least one seed image, wherein the image generation module is further configured to:
retain the plurality of segments as a residual image, wherein the residual image does not match with the at least one seed image; and
store the plurality of segments as seed images, wherein the seed images are assigned at least one unique seed image identifier; and
an image storage module configured to store the image as the residual image along with the at least one seed image identifier linking to the at least one seed image.

18. The system of claim 17, wherein the image compression module further comprises an image reconstruction module configured to:
receive a request for the image;
retrieve the at least one of the residual image and the one or more seed images associated with the image;
reconstruct the image using the at least one of the residual image and the one or more seed images associated with the image; and
display the image on a display device.

* * * * *